United States Patent
Choi et al.

(10) Patent No.: US 10,635,270 B2
(45) Date of Patent: Apr. 28, 2020

(54) METHOD AND APPARATUS FOR CONFIGURING HOME SCREEN OF DEVICE

(71) Applicant: SAMSUNG ELECTRONICS CO., LTD., Suwon-si (KR)

(72) Inventors: Kwang-pyo Choi, Anyang-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 14/285,817

(22) Filed: May 23, 2014

(65) Prior Publication Data

US 2015/0026615 A1    Jan. 22, 2015

(30) Foreign Application Priority Data

Jul. 19, 2013  (KR) .......................... 10-2013-0085687

(51) Int. Cl.
| | | |
|---|---|---|
| *G06F 3/0481* | (2013.01) | |
| *G06F 3/0484* | (2013.01) | |
| *G06F 3/0488* | (2013.01) | |
| *G06F 3/0482* | (2013.01) | |

(52) U.S. Cl.
CPC .......... *G06F 3/0484* (2013.01); *G06F 3/0482* (2013.01); *G06F 3/0488* (2013.01)

(58) Field of Classification Search
CPC ...... G06F 3/0484; G06F 3/0482; G06F 3/048; G06F 3/0481; G06F 17/30994; H04N 5/445; H04N 7/16; H04N 1/00
See application file for complete search history.

(56) References Cited

U.S. PATENT DOCUMENTS

| | | | | |
|---|---|---|---|---|
| 7,062,422 | B2 * | 6/2006 | Inoko | G05B 19/05 700/2 |
| 7,747,086 | B1 | 6/2010 | Hobbs et al. | |
| 7,870,496 | B1 | 1/2011 | Sherwani | |
| 8,176,435 | B1 * | 5/2012 | Jitkoff | G06F 3/04883 715/701 |
| 9,448,691 | B2 * | 9/2016 | Suda | G06F 3/0488 |
| 9,946,427 | B1 * | 4/2018 | Murphy | G06F 3/0481 |
| 9,959,016 | B2 * | 5/2018 | Kim | G06F 3/0483 |

(Continued)

FOREIGN PATENT DOCUMENTS

| | | |
|---|---|---|
| CN | 102572096 A | 7/2012 |
| EP | 2 587 771 A1 | 5/2013 |

(Continued)

OTHER PUBLICATIONS

Array. (2011). In the Editors of the American Heritage Dictionaries & TheEditorsoftheAmericanHeritageDictionaries (Eds.), The American Heritage Dictionary of the English language. Boston, MA: Houghton Mifflin. Retrieved from http://search.credoreference.com/content/entry/hmdictenglang/array/0.*

(Continued)

*Primary Examiner* — Steven P Sax

(74) *Attorney, Agent, or Firm* — Sughrue Mion, PLLC

(57) ABSTRACT

Provided is a method of configuring a home screen. The method includes configuring, at a first device, a home screen of a second device, and transmitting, from the first device, information about the home screen to the second device, wherein the home screen includes a graphical user interface (GUI) to be displayed by the second device.

20 Claims, 11 Drawing Sheets

(56) References Cited

U.S. PATENT DOCUMENTS

| | | | |
|---|---|---|---|
| 2006/0235944 A1* | 10/2006 | Haslam | G06F 9/44505 709/217 |
| 2006/0277577 A1 | 12/2006 | Kiiskinen et al. | |
| 2008/0010664 A1 | 1/2008 | Pelizza et al. | |
| 2009/0006946 A1* | 1/2009 | Hanson | G06F 17/24 715/255 |
| 2010/0162127 A1 | 6/2010 | Uchino | |
| 2010/0295789 A1* | 11/2010 | Shin | G06F 3/0486 345/168 |
| 2010/0313125 A1* | 12/2010 | Fleizach | G06F 3/04883 715/702 |
| 2010/0333036 A1* | 12/2010 | Matsuyama | H04N 5/44543 715/835 |
| 2011/0093822 A1 | 4/2011 | Sherwani | |
| 2011/0225553 A1 | 9/2011 | Abramson et al. | |
| 2012/0023524 A1* | 1/2012 | Suk | H04N 21/42222 725/43 |
| 2012/0088548 A1* | 4/2012 | Yun | G08C 17/02 455/557 |
| 2012/0133601 A1* | 5/2012 | Marshall | G06F 19/321 345/173 |
| 2012/0159472 A1 | 6/2012 | Hong et al. | |
| 2012/0212761 A1* | 8/2012 | Kuroyanagi | G06F 9/4443 358/1.13 |
| 2012/0287034 A1 | 11/2012 | Park et al. | |
| 2013/0050119 A1* | 2/2013 | Nemoto | G06F 3/0488 345/173 |
| 2013/0083075 A1 | 4/2013 | Luomala et al. | |
| 2013/0086527 A1* | 4/2013 | Inkala | G06F 3/0484 715/825 |
| 2013/0135236 A1* | 5/2013 | Yano | G06F 3/0483 345/173 |
| 2013/0151981 A1 | 6/2013 | Green | |
| 2013/0167074 A1* | 6/2013 | Oonishi | G06F 3/0488 715/799 |
| 2013/0187866 A1* | 7/2013 | Kim | G06F 3/0488 345/173 |
| 2013/0254692 A1* | 9/2013 | Han | G06F 3/0486 715/769 |
| 2014/0082514 A1* | 3/2014 | Sivaraman | G06F 3/0219 715/745 |
| 2014/0123013 A1* | 5/2014 | Lee | H04M 1/72544 715/719 |
| 2014/0143695 A1* | 5/2014 | Sundermeyer | H04L 41/22 715/765 |
| 2014/0189596 A1* | 7/2014 | Taniuchi | G06F 3/0482 715/835 |
| 2014/0337752 A1* | 11/2014 | Cammarata | H04M 1/72563 715/744 |
| 2014/0344735 A1* | 11/2014 | Wang | G06F 3/0486 715/765 |
| 2015/0169211 A1 | 6/2015 | Shin et al. | |

FOREIGN PATENT DOCUMENTS

| | | |
|---|---|---|
| JP | 2010-146504 A | 7/2010 |
| JP | 2012-190326 A | 10/2012 |
| JP | 2012-527684 A | 11/2012 |
| JP | 2013-137669 A | 7/2013 |
| KR | 1020130024623 A | 3/2013 |
| RU | 2 391 780 C2 | 6/2010 |

OTHER PUBLICATIONS

Communication dated Aug. 25, 2014, issued by the International Searching Authority in counterpart International Application No. PCT/KR2014/004439.

Communication dated Feb. 21, 2017 issued by Japanese Intellectual Property Office in counterpart Japanese Application No. 2016-527908.

Communication dated Jan. 30, 2017 issued by European Patent Office in counterpart European Patent Application No. 14825870.0.

Communication dated Oct. 10, 2017, issued by the Japanese Patent Office in counterpart Japanese Application No. 2016-527908.

Communication dated Feb. 11, 2018, issued by the State Intellectual Property Office of the People's Republic of China in counterpart Chinese Patent Application No. 201480051894.5.

Communication dated May 15, 2018 issued by the Russian Patent Office in counterpart Russian Application No. 2016105433.

Search Report dated May 15, 2018 issued by the Russian Patent Office in counterpart Russian Application No. 2016105433.

Communication dated Oct. 29, 2018 issued by the European Intellectual Property Office in counterpart European Application No. 14 825 870.0.

Communication dated Apr. 3, 2019, issued by European Patent Office in counterpart European Application No. 14 825 870.0.

Teamviewer GmbH: "TeamViewer GmbH @BULLET KuhnbergstraBe 16 D-73037 Goppingen", Aug. 16, 2012, XP 055574590, Retrieved from the Internet: URL: https://www.teamviewer.com/en/res/pdf/TeamViewer7_Manual_RemoteControl_EN.pdf [retrieved on Mar. 26, 2019].

Communication dated Oct. 31, 2019 issued by the European Patent Office in counterpart European Application No. 14825870.0.

Communication dated Jan. 21, 2020 issued by the Korean Intellectual Property Office in counterpart Korean Patent Application No. 10-2013-0085687.

* cited by examiner

METHOD AND APPARATUS FOR CONFIGURING HOME SCREEN OF DEVICE

CROSS-REFERENCE TO RELATED APPLICATION

This application claims priority from Korean Patent Application No. 10-2013-0085687, filed on Jul. 19, 2013, in the Korean Intellectual Property Office, the disclosure of which is incorporated herein in its entirety by reference.

BACKGROUND

1. Field

Apparatuses and methods consistent with exemplary embodiments relate to a method of configuring, by a first device, a home screen of a second device.

2. Description of the Related Art

A home screen of a device is a screen that first appears when the device is turned on. The home screen may include a widget or an icon of an application.

An existing idle screen of a device may display simple information such as time, a background image, or the like. Further, a home screen of a device, including recent smartphones, may include various graphical user interfaces (GUIs) so that the home screen may provide various types of information that may help a user to use the device.

Because the home screen is a first contact to the user when the user attempts to use the device, device use by the user may vary according to the configuration of the home screen. Accordingly, it is beneficial to provide further ease for configuring and managing the home screen of devices.

SUMMARY

One or more exemplary embodiments include a method of configuring, by a first device, a home screen of a second device.

According to an aspect of an exemplary embodiment, there is provided, a method of configuring home screens using a first device, the method including configuring, at the first device, a home screen of a second device, and transmitting, from the first device, information about the home screen to the second device, wherein the home screen includes a graphical user interface (GUI) configured to be displayed by the second device.

The configuring of the home screen may include obtaining, by the first device, home screen configuration information of the second device, displaying, on a portion of the first device, the home screen of the second device, based on the home screen configuration information, receiving, at the first device, an input for configuring the home screen of the second device, and configuring, at the first device, the home screen of the second device according to the input.

The obtaining, by the first device, home screen configuration information may include obtaining at least one piece of home screen configuration information corresponding to one or more devices that belong to one group, and wherein the displaying, on a portion of the first device, the home screen may include displaying home screens of the one or more devices, based on the at least one piece of home screen configuration information.

The configuring, at the first device, the home screen may include configuring the home screen of the second device by using at least one component, and wherein the at least one component may include at least one of a widget, an application execution icon, a dock bar, a status bar, a background image, and an output effect that can be used so as to configure the home screen of the second device.

The method may further include setting a setting information based on display environment information of the second device, wherein setting information includes at least one of array methods, sizes, shapes, and designs according to components on the home screen of the second device, and wherein the configuring, at the first device, the home screen may include configuring the home screen of the second device by setting display information including at least one of an array, a position, and a shape of the at least one component, based on the setting information.

The configuring, at the first device, the home screen may further include obtaining, at the first device, home screen configuration information of the second device, displaying the home screen of the second device, based on the home screen configuration information, displaying one or more components, selecting at least one component from among the one or more components, and configuring the home screen of the second device by setting display information including at least one of an array, a position, and a shape of the at least one component.

The displaying the one or more components may include obtaining, at the first device, home screen configuration information of the first device, displaying a local home screen of the first device including one or more components that can be selected, based on the home screen configuration information of the first device, selecting at least one component of the one or more components that are included in the local home screen of the first device, and displaying the selected at least one component that is added to the home screen of the second device.

The method may further include generating an event in at least one of the first device and the second device, changing, using the first device, the home screen of the second device in response to the event, and transmitting information about the changed home screen to the second device.

The event may include at least one of deletion and installation of an application in the first device and the second device.

The event may include a change in display information of a component included in a home screen of the first device, and wherein the display information of the component includes at least one of an array, a position, and a shape of the component.

According to an aspect of another exemplary embodiment, there is provided, a method of configuring a home screen using a first device, the method including receiving, at a second device, input information from an input for configuring a home screen of the second device, transmitting the input information to the first device, and configuring, using the first device, the home screen of the second device according to the input information, wherein the home screen includes a graphical user interface (GUI) configured to be displayed by the second device.

The configuring, using the first device, the home screen may include configuring the home screen of the second device by setting display information including at least one of a size, a position, a shape, and a design of a component, and wherein the component includes at least one of a widget, an application execution icon, a dock bar, a status bar, a background image, and an output effect that can be used so as to configure the home screen of the second device.

The component may further include setting information in which at least one of an array method, a size, a shape, and a design on the home screen of the second device is set based on the component and on display environment information of the second device, and wherein the configuring of the home screen includes configuring the home screen of the second device by setting at least one of a size, a position, a shape, and a design of the component, based on the setting information.

According to an aspect of another exemplary embodiment, there is provided, a device including a controller configured to generate configuration information for configuring a home screen of an external device, and a communicator configured to transmit the configuration information to the external device, wherein the home screen includes a graphical user interface (GUI) configured to be displayed by the external device.

The controller may be further configured to obtain home screen configuration information of the external device, wherein the device may further include a display configured to display the home screen of the external device, based on the home screen configuration information, and an inputter configured to receive an input for configuring the home screen of the external device, and wherein the controller may be further configured to generate the configuration information for configuring the home screen of the external device according to the input received by the inputter.

The controller may be further configured to obtain home screen configuration information of the device and each of one or more external devices, and select at least one component from among components included in a local home screen that is displayed by the display, and wherein the display may be further configured to display the local home screen including one or more components of the device and each of the one or more external devices, based on the home screen configuration information, display the selected at least one component that is added to the home screen of the second device.

The controller may change the home screen of the external device in response to an event that is generated in at least one of the device and the external device.

According to an aspect of another exemplary embodiment, there is provided, a second device including a communicator configured to receive, from a first device, home screen configuration information of the second device, a display configured to display a home screen of the second device, based on the home screen configuration information of the second device, and a controller configured to control the communicator and the display, wherein the home screen includes a graphical user interface (GUI) configured to be displayed by the second device.

The communicator may be further configured to change the home screen configuration information in response to an event that is generated in at least one of the first device and the second device, and wherein the display displays the home screen of the second device, based on the changed home screen configuration information of the second device.

According to an aspect of another exemplary embodiment, there is provided, a first device including a communicator configured to receive, from a second device, input information so as to configure a home screen of the second device, and a controller configured to configure the home screen of the second device according to the input information, wherein the home screen includes a graphical user interface (GUI) configured to be displayed on the second device.

According to an aspect of another exemplary embodiment, there is provided, a second device including an inputter configured to receive input information from an input for configuring a home screen of the second device, a communicator configured to transmit the input information to a first device and receive, from the first device, home screen configuration information of the second device, wherein the home screen configuration information corresponds to the home screen that is configured according to the input information, and a display configured to display the home screen of the second device, based on the home screen configuration information of the second device, wherein the home screen includes a graphical user interface (GUI) configured to be displayed by the second device.

According to an aspect of another exemplary embodiment, there is provided, a non-transitory computer-readable recording medium having recorded thereon a computer program for executing the method of configuring a home screen in a first device, the method including configuring a home screen of a second device, and transmitting information about the home screen to the second device, wherein the home screen includes a graphical user interface (GUI) configured to be displayed by the second device.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1A:
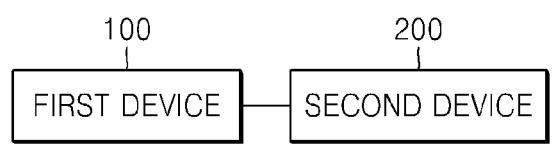
FIGS. 1A and 1B are block diagrams of systems that are capable of performing a method of configuring a home screen, according to exemplary embodiments.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Throughout the specification, the term "gesture" means a user's hand motion so as to control a mobile terminal. For example, in one or more exemplary embodiments, the gesture may include a drag.

The term "drag" means a motion in which a user touches a screen with a user's finger or a touch instrument and then moves the finger or the touch instrument to another position on the screen while the touch is maintained. Due to the drag, an object may move or a screen may be switched.

The term "home screen" may indicate a screen that first appears when a device is turned on, but one or more exemplary embodiments are not limited thereto, and the home screen may also indicate a screen that includes one or more user interfaces such as a widget, an icon, or the like.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Figure 1B:
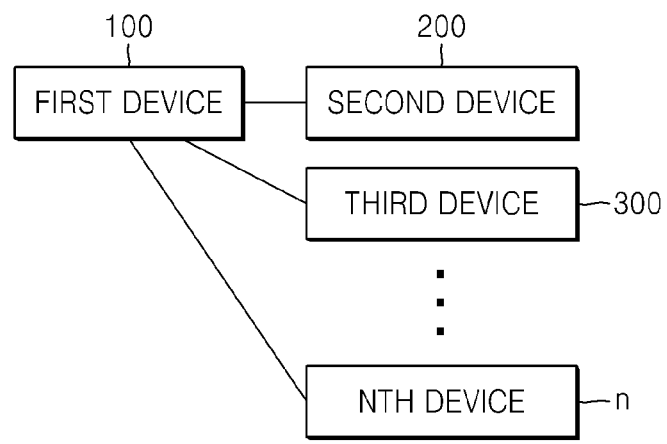

FIGS. 1A and 1B are block diagrams of systems that are capable of performing a method of configuring a home screen, according to exemplary embodiments.

Referring to FIG. 1A, the system that is capable of performing a method of configuring a home screen may include a first device 100 and a second device 200.

The first device 100 and the second device 200 may be variously embodied. Examples of the first device 100 and the second device 200 that are described in the specification may include, but are not limited to, mobile phones, smartphones, notebook computers, digital broadcast terminals, personal digital assistants (PDAs), portable multimedia players (PMPs), navigation devices, and tablet personal computers (PCs).

In an exemplary embodiment, the first device 100 may configure and manage a home screen of the second device 200. Thus, hardware or software of the first device 100 may have a higher performance than that of the second device 200, so that the first device 100 may configure and manage a home screen of another device.

Hereinafter, to configure the home screen may mean to edit or to delete components such as an icon, a background image, or the like that may configure the home screen, or may mean to add a new component to the home screen. Also, to manage the home screen may mean to store information about the home screen in a memory.

For example, the first device 100 may be a device such as a smartphone, a notebook computer, a tablet PC, or a smart TV that has high-performance hardware or software. Also, the second device 200 may be a terminal device such as a digital broadcast terminal, a navigation device, a smart watch, or a smart glass that is limited in its use or size, such that functions thereof are limited, compared to the first device 100.

Alternatively, the first device 100 may be a device such as a smartphone or a tablet PC that a user may easily manipulate. The second device 200 may be a device such as a smart watch or a smart glass that is limited in its screen size or input method so that a user may not easily manipulate them. Further, the second device 200 may also be another high performance device with high performance hardware or software, such as another smartphone, a tablet PC, a notebook computer, or a smart TV that is located such that a user may not easily manipulate the device due to a distance between the user and the device or a difficult device to user orientation.

The digital broadcast terminal and the navigation device mainly provide digital broadcast and road guidance, respectively. Thus, each of the digital broadcast terminal and the navigation device may include hardware or software so as to optimally provide its main function, and thus the digital broadcast terminal and the navigation device may be limited in providing functions other than a main function, compared to a smartphone, a tablet PC, a notebook computer, or a smart TV.

The smart watch and the smart glass are limited in size or weight so as to achieve portability, and, accordingly, the smart watch and the smart glass may include low-performance hardware or software, compared to a smartphone, a tablet PC, a notebook computer, or a smart TV, and a user may not easily manipulate them.

Thus, according to an exemplary embodiment, the first device 100 may configure or manage the home screen of the second device 200. The present exemplary embodiment may provide a graphical user interface (GUI) by which the first device 100 may conveniently configure or manage the home screen of the second device 200, compared to a case in which the second device 200 configures or manages its own home screen.

Also, according to an exemplary embodiment, a body that manages the home screen of the second device 200 may not be limited to the first device 100 having high-performance hardware or software. That is, when a device from among devices that are used by a user is set as the first device 100, the user may edit or manage home screens of the other devices.

Although the device is set as the first device 100, another device may configure or manage a home screen of the first device 100. That is, the first device 100 may be the second device 200 of which a screen is configured or managed by the other device. For example, according to an exemplary embodiment, a desktop or notebook computer may configure and manage the home screens of a smartphone and tablet and in turn the smartphone and tablet may configure and manage the home screens of other devices such as a smart TV, a smart watch, and a smart glass. Alternatively, the smart phone or tablet may configure the home screens of the desktop and notebook or any other combination thereof may be envisioned where layered control of home screens in present.

Referring to FIG. 1B, the system that is capable of performing a method of configuring a home screen may include a first device 100 and devices 200, 300, . . . , n. The devices 200, 300, . . . , n may correspond to the second device 200 of FIG. 1A.

In an exemplary embodiment, the first device 100 may configure and manage home screens of the devices 200, 300, . . . , n. That is, the first device 100 may configure and manage not only the home screen of the device 200 but also the home screens of the devices 300, . . . , n. The first device 100 and the devices 200, 300, . . . , n may belong to the same group or may be devices of the same user.

Figure 2:
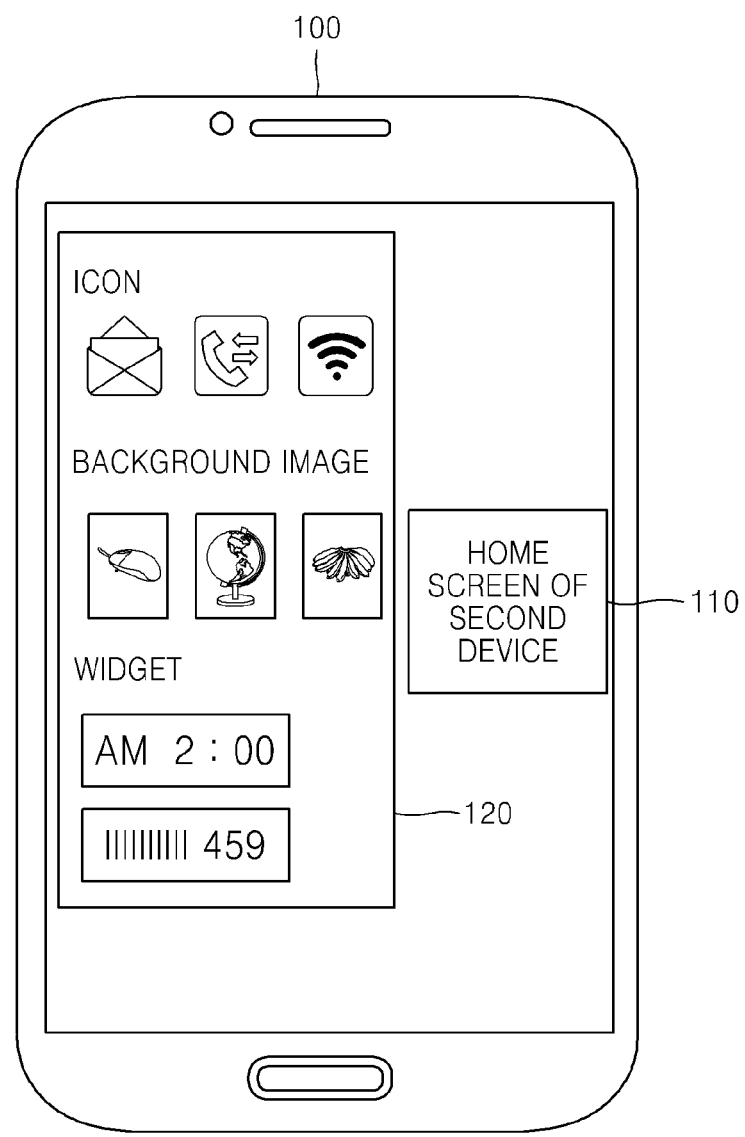
FIG. 2 illustrates a method of configuring a home screen, according to an exemplary embodiment.

FIG. 2 illustrates a method of configuring a home screen, according to an exemplary embodiment.

Referring to FIG. 2, a user of the first device 100 may edit a home screen 110 of the second device 200 by using components 120.

The home screen 110 that may be configured or managed by the first device 100 may include the components 120.

In an exemplary embodiment, the components 120 that may be included in the home screen 110 are GUIs such as a widget, an application execution icon, a dock bar, a status bar, a background image, and an output effect of the home screen 110.

The widget of the home screen 110 may provide various types of information without executing a web browser or an application or may allow functions such as the weather, a calculator, a clock, or the like to be directly executed on the home screen 110.

The application execution icon may be added to the home screen 110, and then provide a function to allow an application, which is installed in the home screen 110, to be directly executed on the home screen 110.

The dock bar of the home screen 110 may include one or more application execution icons.

The status bar of the home screen 110 may provide information indicating an execution status of an application or a current status (e.g., a battery status, a notice message reception, or the like) of a terminal device.

The background image may provide a design effect as a background of the home screen 110. The background image may be set to be switched while changing images of the home screen 110 or to be output from different positions. The background image may provide not only a design effect but also may provide useful information such as the weather, stock information, news, or the like.

The output effect may mean a display effect on the home screen 110 when a gesture is input. For example, when a dragging gesture is input, a screen of the home screen 110 may be switched, and various screen switch effects may be displayed when the screen is switched. The screen switch effects may include not only video effects but also may include audio effects.

Figure 3:
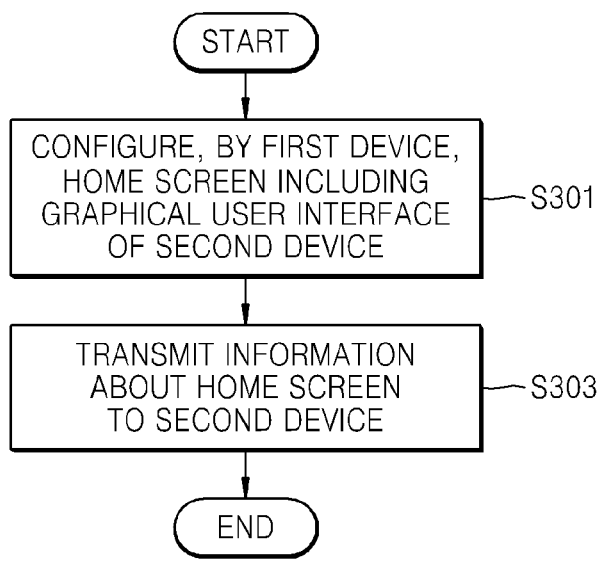
FIG. 3 is a flowchart of a method of configuring a home screen, according to an exemplary embodiment.

FIG. 3 is a flowchart of a method of configuring a home screen, according to an exemplary embodiment.

Referring to FIG. 3, in operation S301, the first device 100 may configure a home screen including a GUI of the second device 200.

In operation S301, the home screen may be configured by components including a GUI. The components may include a user interface that is capable of controlling the second device 200. Further, the present exemplary embodiment is not limited thereto, and the components may provide an aesthetic effect or an audio effect which is not related to controlling the second device 200.

In operation S303, the first device 100 may transmit, to the second device 200, home screen configuration information about the home screen that is configured in operation S301. The home screen configuration information may be a result obtained by configuring the home screen in operation S301, and may include a plurality of pieces of information about identification (ID) information, a position, and a function of components included in the home screen. Based on the home screen configuration information that is transmitted to the second device 200, the second device 200 may display the home screen of the second device 200.

Figure 4:
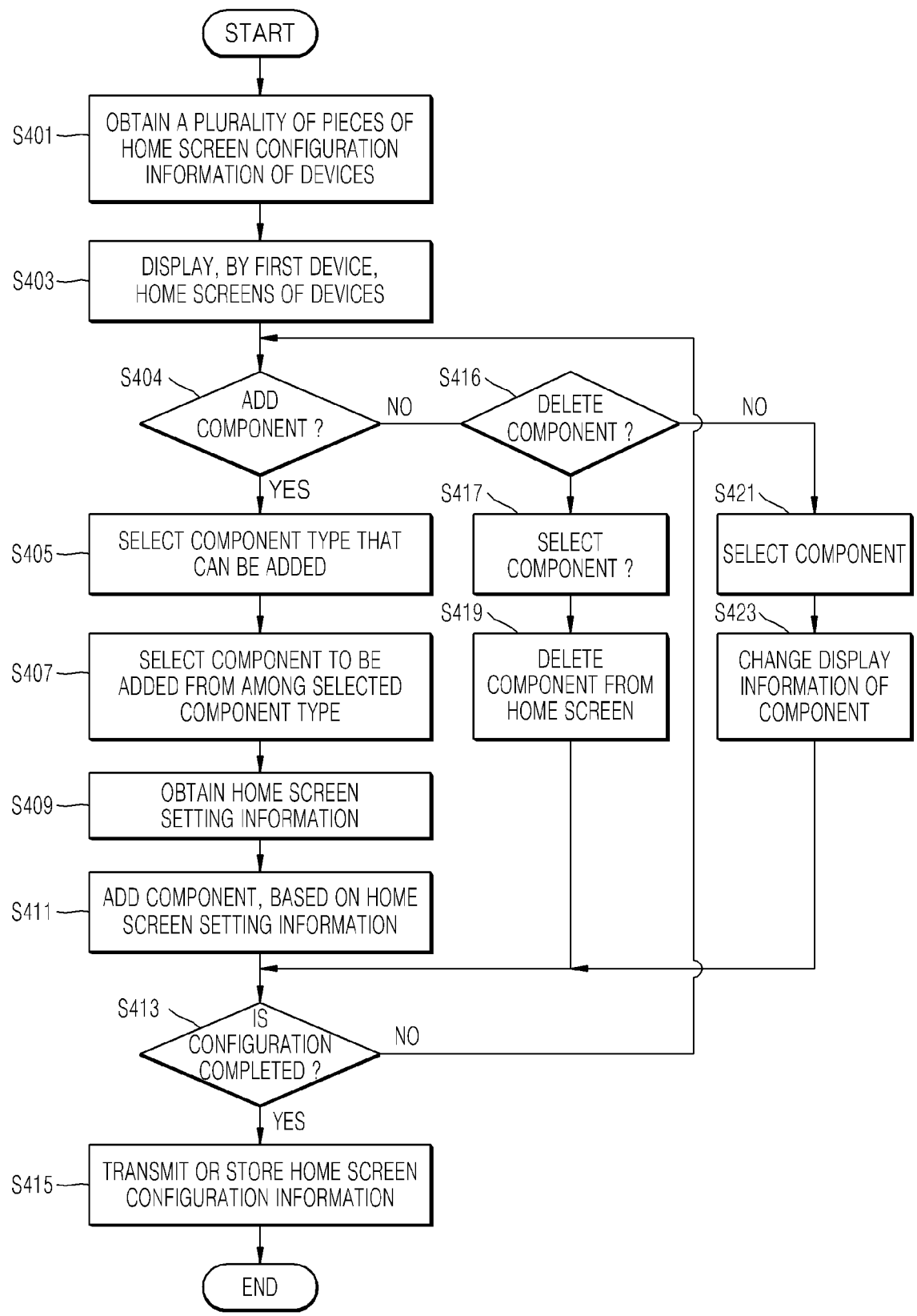
FIG. 4 is a flowchart of a method of configuring a home screen by using components, according to an exemplary embodiment.

FIG. 4 is a flowchart of a method of configuring a home screen by using components, according to an exemplary embodiment.

Referring to FIG. 4, in operation S401, the first device 100 may obtain a plurality of pieces of home screen configuration information of devices. Each of the plurality of pieces of home screen configuration information may include a plurality of pieces of information related to components that configure a home screen, i.e., a type, a position, a shape, ID information, or the like of each of the components.

The first device 100 may store the plurality of pieces of home screen configuration information of the devices in a memory of the first device 100. Thus, in operation S401, the first device 100 may obtain the plurality of pieces of home screen configuration information of the devices by fetching the plurality of pieces of home screen configuration information stored in the memory. Alternatively, the first device 100 may request and receive a plurality of pieces of home screen configuration information from target devices, respectively, so that the first device 100 may obtain the plurality of pieces of home screen configuration information of the devices from the devices themselves. Further, the first device 100 may obtain the plurality of pieces of home screen configuration information of the devices from a device that was previously set as the first device for configuring and managing or from a designated device that routinely collects such information. For example, the first device 100, which may be a user's smartphone, may obtain the plurality of pieces of home screen configuration information of the devices from a tablet that was previously serving as the device that configured and managed the home screens. Alternatively, according to another example, the user's smartphone may obtain the plurality of pieces of home screen configuration information from a home desktop or notebook which has been regularly updating and storing the plurality of pieces of home screen configuration information of the devices.

The first device 100 may periodically request and receive the plurality of pieces of home screen configuration information from the devices, respectively, and then may store the plurality of pieces of home screen configuration information. By doing so, the first device 100 may obtain changed home screen configuration information of each of the devices in operation S401 when the home screen configuration information is changed and stored in a memory of each of the devices. For example, in operation S401, when a predetermined time period elapses after home screen configuration information of a device is received and stored in the memory of the first device 100, the first device 100 may request and receive home screen configuration information of the device from the device, so that the first device 100 may obtain the home screen configuration information of the device. Another example may be when a certain process, program, command, update, or other such triggering event occurs that may affect the home screen within a device, the device may at that point opt to send the updated home screen configuration information to the first device 100 at that point so that the device 100 may have up to date information stored for using when configuring and managing the home screens.

In operation S403, the first device 100 may display home screens of the devices on the first device 100, based on the plurality of pieces of home screen configuration information obtained in operation S401.

The first device 100 may display a home screen of a device that is selected by a user. For example, before the first device 100 displays the home screens of the devices, the first device 100 may display thumbnails that are generated based on the plurality of pieces of home screen configuration information of the devices, respectively, and may then display the home screen of the device that is selected by the user based on the thumbnails.

The home screen configuration information may include a plurality of pieces of information such as positions, an array, sizes, ID information, or the like of components included in the home screen, and function performance information of each of the components. The function performance information may include information indicating what function each of the components does in the home screen, e.g., whether each of the components provides information such as news, the weather, a data usage, or the like, or whether each of the components performs application functions such as a walk counter, memory optimization, or the like, or, if a corresponding component is an application execution icon, the function performance information may include information about an application that the component executes.

In operation S404, the first device 100 may determine whether to add or delete a component in the home screen. This determination may be determined automatically based on received home screen information or may be determined based on a user's input.

For example, when the component is added, in operation S405, the first device 100 may select a component type of the component to be added to the displayed home screen of the second device 200, according to a user input. Component types may include a widget, an application execution icon, a dock bar, a status bar, a background image, and an output effect. Each of the component types may include components having various functions or designs.

The first device 100 may display the component types that may be added to the home screen of the second device 200, and then the first device 100 may display the components that belong to each of the component types, so that the user may select a component in operation S405.

In operation S407, according to a user input, the first device 100 may select the component, which may be added to the home screen of the second device 200, from among the components that belong to the component type selected in operation S405. Further, according to an exemplary embodiment, the user may select a component once, but do so in such a manner that implicates that the user wants it applied to all, or a subset of, home screens that are controlled by the first device 100 which may or may not include the first device's 100 home screen as well.

Additionally, in operations S405 and S407, according to a user input, the first device 100 may select one of the components included in the home screens of the devices that are displayed on the first device 100. The home screens of the devices may include a home screen of the first device 100.

In operation S409, the first device 100 may obtain home screen setting information about the home screen of the device to which the component selected in operation S407 is to be added.

The home screen setting information may include setting information in which an array, sizes, and shapes of components are set according to the component types, in consideration of display environment information of the second device 200. The display environment information of the second device 200 may include information related to a resolution, a size, or a function of a display of the second device 200.

For example, when the component type is an application execution icon, the home screen setting information may include information in which an area of the home screen in which the application execution icon may be positioned, a size of the application execution icon, and an array method (e.g., how many icons are included in each line) are set.

For example, when the component type is a dock bar, the home screen setting information may include information about an area of the home screen in which the dock bar may be positioned, a size of the dock bar, a size of an icon that may be included in the dock bar, an array method, and a drag possibility to turn a page of the dock bar.

For example, when the component type is a status bar, the home screen setting information may include basic information (e.g., a plurality of pieces of information such as a current time, dates, the weather, or the like) that may be included in the status bar, an area of the home screen in which the status bar may be positioned, and a size of an icon that may be included in the status bar.

For example, when the component type is a background image, the home screen setting information may include information about a size ratio of an image that may be set as the background image or an appropriate occupancy rate of a central processing unit (CPU) when a live background screen is executed.

For example, when the component type is an output effect, the home screen setting information may include information about whether an output effect of a page turn may be output if the home screen includes a plurality of pages, or information about in which case the output effect may be output at the home screen. The output effect may include a video or audio effect that makes a cognition rate of the page turn improved when the user uses a device.

The home screen setting information may be set according to the devices. Because the display environment information (e.g., displayable resolution, a displayable screen size, or the like) varies according to each of the devices, setting to optimally display the components may also vary.

In operation S411, the first device 100 may add the component selected in operation S407 to the home screen of the second device 200, based on the home screen setting information that is obtained in operation S409. In more detail, according to the home screen setting information, the first device 100 may dispose the selected component or may set a shape of the selected component and then may add the selected component to the home screen of the second device 200.

Alternatively, as described above, in operations S405 and S407, according to the user input, the first device 100 may select one of the components included in the home screens of the devices that are displayed on the first device 100. In this case, in operation S411, the first device 100 may add a component to the home screen of the second device 200, wherein the component corresponds to the selected component and is changed so as to be added. Because a resolution or a size of a display may vary according to devices, the changed component may be optimized in consideration of the display environment information of the second device 200.

In addition, after the component is added to the home screen, the first device 100 may set at least one of a position, a shape, a design, and a size of the component. According to a user input or automatically, the first device 100 may optimally set at least one of the position, the shape, the design, and the size of the component In operation S413, when the first device 100 completes editing of the home screen of the second device 200 by adding or deleting the component, in operation S415, the first device 100 may transmit, to the device, the home screen configuration information of the device of which edition is completed. Also, in operation S415, the first device 100 may store the home screen configuration information in a memory of the first device 100.

In a case where the first device 100 manages the home screens of the devices, if the first device 100 transmits home screen configuration information to each of the devices whenever the first device 100 completes an editing operation, overload may occur due to the transmission. In order to prevent the overload, the first device 100 may store the home screen configuration information in its memory, and may periodically transmit the home screen configuration information to each of the devices or may transmit the home screen configuration information to each of the devices when a load of the CPU is small.

On the other hand, in operation S413, when the first device 100 has not completed editing of the home screen of the second device 200, the first device 100 may return to operation S404 and then may add or delete a component to the home screen of the second device 200.

In operation S404, when the first device 100 determines not to add a component to the home screen of the second device 200, in operation S416, the first device 100 may determine whether to delete the component or to change display information of the component. The determination may be performed according to a user input or deletion of an application.

In operation S416, when the first device 100 determines to delete the component, in operation S417, the first device 100 may select a component to be deleted. The first device 100 may select the component to be deleted, according to a user input.

In operation S419, the first device 100 may delete the component, which is selected in operation S417, from the home screen.

For example, the selected component may be deleted according to a user input, or an application execution icon or a widget of the deleted application may be deleted. The deleted application may be an application that was installed in the second device 200.

In operation S416, when the first device 100 determines not to delete or add a component, otherwise, the first device 100 may determine that display information of the component is changed.

The display information of the component may include information about how the component is displayed on the home screen. For example, the display information of the component may include information related to a display of the component, such as a position and a size of the component, or the like.

In operation S421, the first device 100 may select the component whose display information is to be changed from the home screen of the second device 200.

In operation S423, the first device 100 may change the display information of the component. The display information of the component may be changed by updating an application related to the component or by a user input.

In operation S413, the first device 100 may determine whether configuration of the home screen of the second device 200 is completed, wherein the configuration may include addition, deletion, or a change of the component.

When the configuration of the home screen of the second device 200 is completed, in operation S415, the first device 100 may store the home screen configuration information in the memory or may transmit the home screen configuration information to the second device 200.

Figure 5:
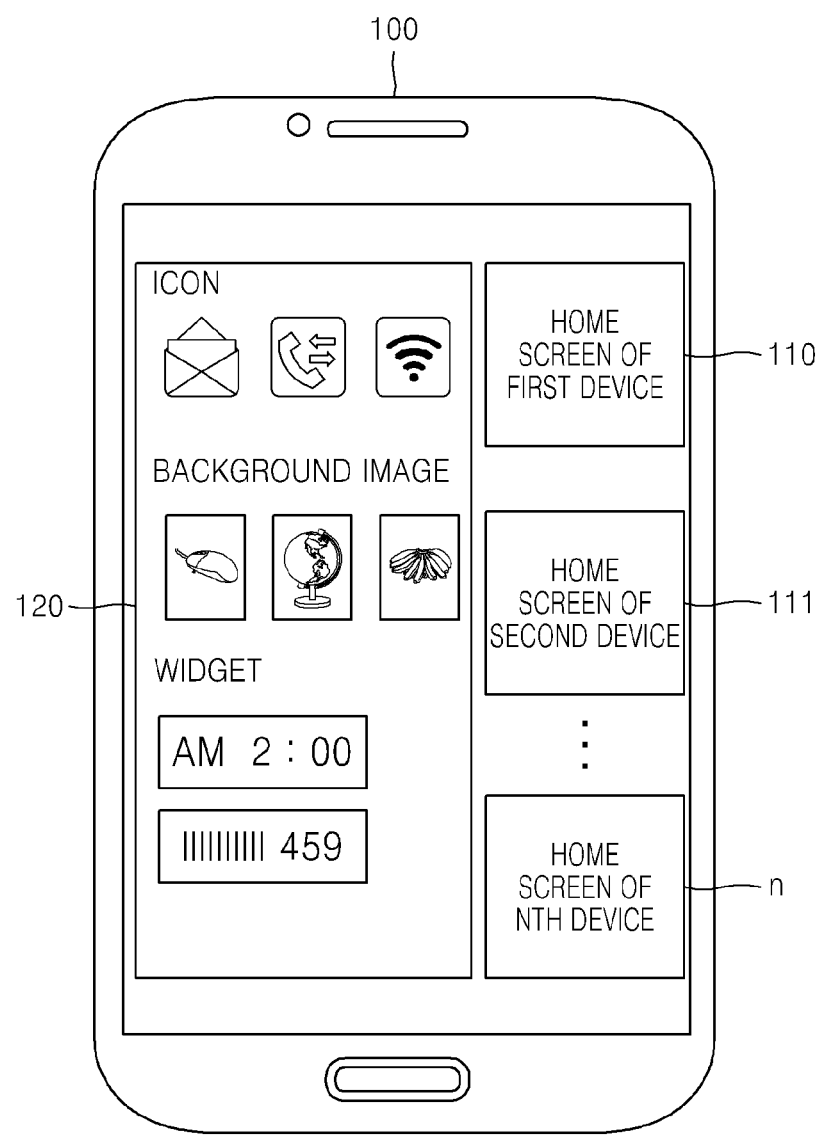
FIG. 5 illustrates a method of configuring home screens of devices, according to an exemplary embodiment.

FIG. 5 illustrates a method of configuring home screens of devices, according to an exemplary embodiment.

Referring to FIG. 5, the first device 100 may display home screens 110, 111, . . . , n of devices so as to configure the home screens 110, 111, . . . , n. Here, the home screen 110 of the first device 100 may also be displayed so that the home screen 110 of the first device 100 may be configured or managed in the same manner as the home screens 111, . . . , n of the other devices.

A home screen of a device which is previously selected by a user input from among the home screens 110, 111, . . . , n of the devices may be displayed.

In an exemplary embodiment, devices whose home screens may be configured in the first device 100 may be devices that belong to a group of the first device 100. For example, devices may be grouped according to users of the devices, network proximity, network connection and mapping, user determined groupings, or another grouping method. One of the devices of each of the groups may be set as the first device 100, and then the first device 100 may configure or may manage home screens of the other devices. The other devices may be devices that belong to the group of the first device 100. The first device 100 may not be limited to one device in the group and may be one or more devices in the group.

Alternatively, a user may directly select, via a user input, devices whose home screens are to be managed by the first device 100, so that home screens of the selected devices may be edited or managed by the first device 100.

Figure 6:
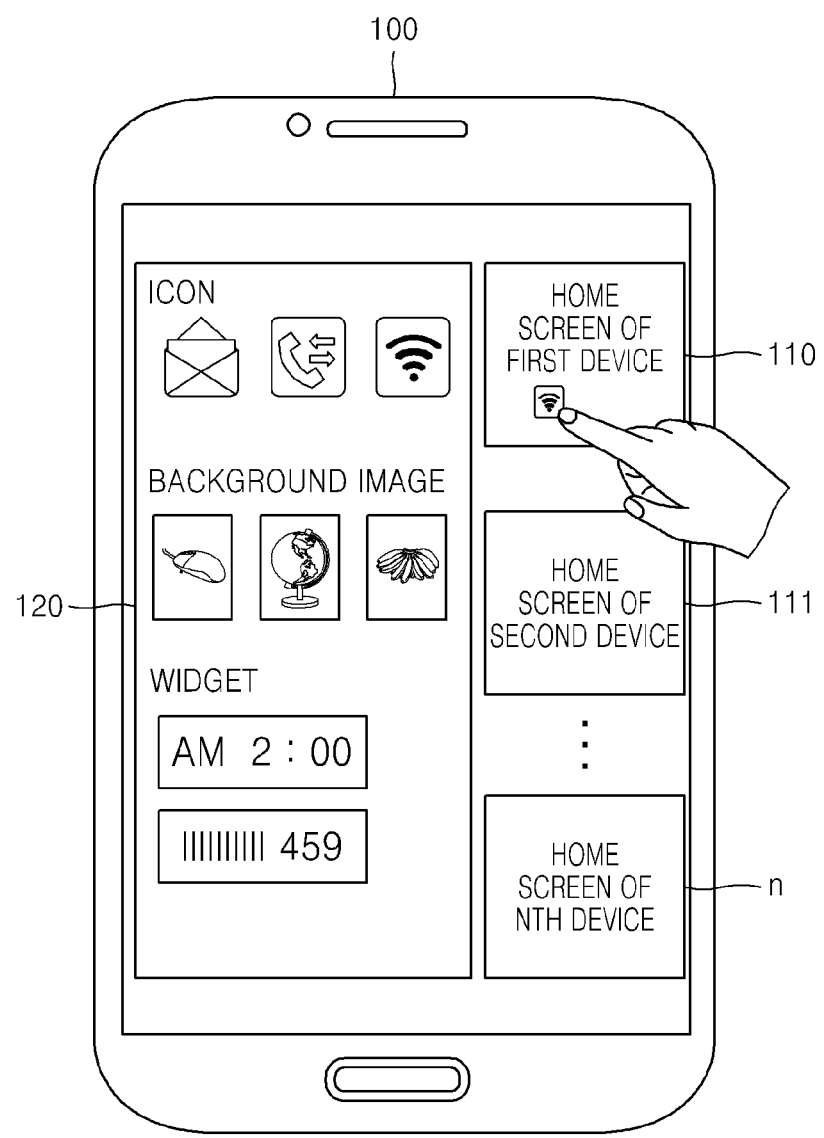
FIG. 6 illustrates a method of configuring a home screen of a device by using a component of another device, according to an exemplary embodiment.

FIG. 6 illustrates a method of configuring a home screen of a device by using a component of another device, according to an exemplary embodiment.

Referring to FIG. 6, according to a user input, the first device 100 may select a component included in one of home screens 110, 111, . . . , n, and may add the component to at least one of the home screens 111, . . . , n of other devices. That is, the first device 100 may select and add not only components 120, which may be added to the other devices and are displayed on the first device 100, but may also select and add components, which are included in the home screens 110, 111, . . . , n of the other devices, to the home screens 110, 111, . . . , n.

The first device 100 may not only add a component but also may select a component, which are included in the home screens 110, 111, . . . , n that are displayed on the first device 100, and may change display information of a component, which is included in one of the home screens 110, 111, . . . , n that are displayed on the first device 100, according to display information of the selected component.

For example, a position or a size of the component included in one of the home screens 110, 111, . . . , n that are displayed on the first device 100 may be changed according to a position or a size of the selected component.

Figure 7:
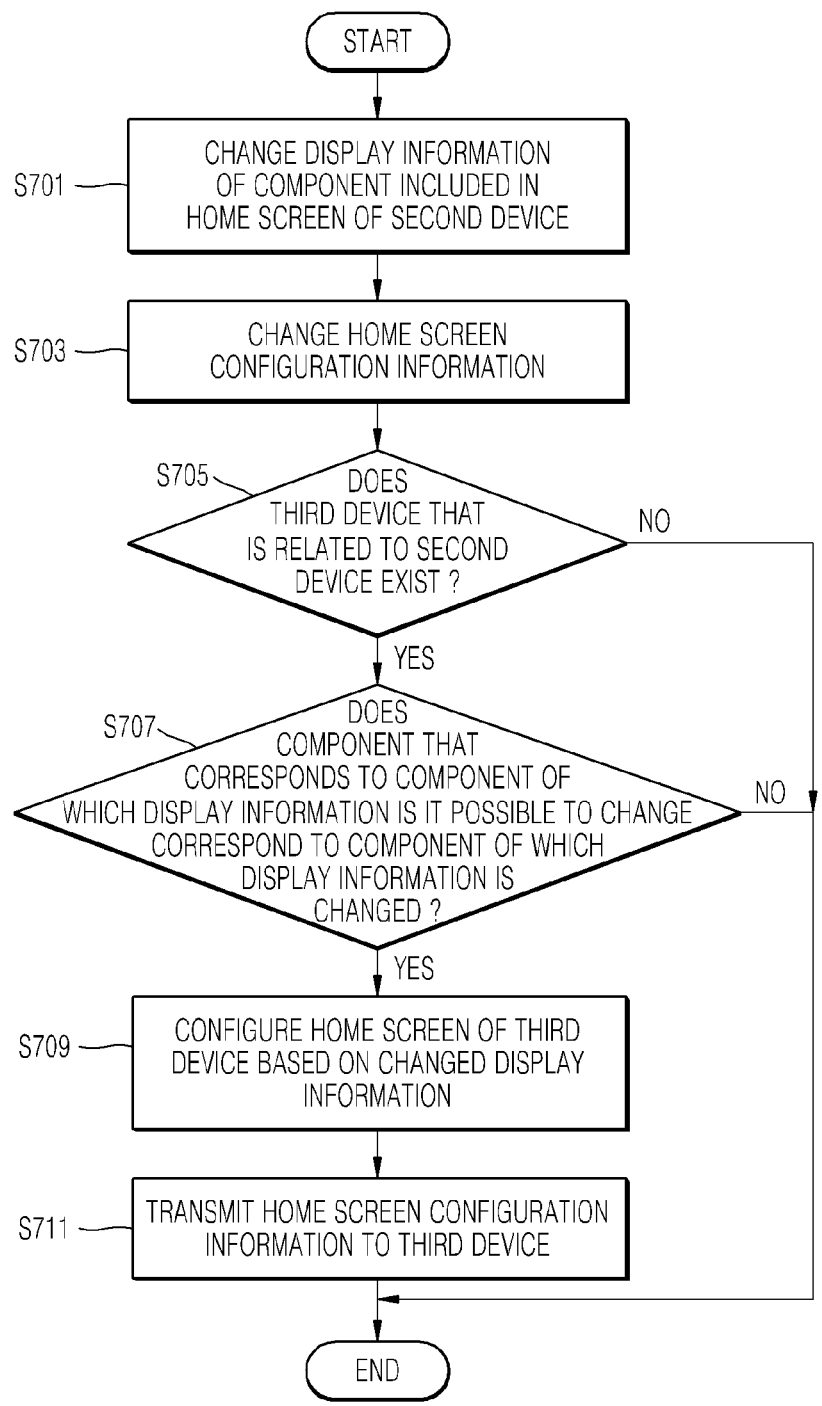
FIG. 7 is a flowchart of a method of configuring a home screen of a device based on a change in configuration of a home screen of another device, according to an exemplary embodiment.

FIG. 7 is a flowchart of a method of configuring a home screen of a device based on a change in configuration of a home screen of another device, according to an exemplary embodiment.

Referring to FIG. 7, when information about a component included in a home screen of a device is changed according to an event that occurs in the first device 100 or in the device that is related to the first device 100, the first device 100 may change a component included in each of home screens of devices that belong to a group including the first device 100, so that the component may correspond to the changed component.

The change of the information about the component or the change of the component may include addition or deletion of the component, a change in display information or a change in information about an executable function.

In operation S701, the first device 100 may change information of a component that is included in a home screen of a device.

Hereinafter, the device of which information of the component is changed is referred to as the second device 200. The second device 200 may be one of devices having home screens that may be managed or configured by the first device 100.

The information of the component may be changed according to a user input or according to occurrence of an event that is related to the component. For example, in a case where the component is an application execution icon, when an application that corresponds to the component is deleted or installed in the second device 200, the component included in a home screen of the second device 200 may be deleted or newly added. Another example, may be when an icon or application is updated by the program developer, such an update may be applied through this process to all devices. Also, if the software is a subscription based offering, if the user either upgrades, downgrade, or has a subscription expire, the associated components can be updated accordingly.

In a case where the component included in the home screen of the second device 200 is a widget, a dock bar, or a status bar, when a design of the widget, the dock bar, or the status bar is changed, if a component that corresponds to the widget, the dock bar, or the status bar exists in a home screen of a device that is related to the second device 200, the component that exists in the home screen may be changed according to the changed design.

For example, when a background image of the home screen of the second device 200 is changed, a background image of the home screen of the device that is related to the second device 200 may be changed to correspond to the changed background image of the second device 200. Here, the background image of the home screen of the second device 200 may be changed based on information about displayable resolution of the second device 200 or a size of a screen of the second device 200.

When a position of the component included in the home screen of the second device 200 is changed, a position of the component that exists in the home screen of the device related to the second device 200 may be changed to correspond to the changed position.

In operation S703, the first device 100 may change configuration information of the home screen of the second device 200 according to information of the changed component. That is, the first device 100 may change the configuration information of the home screen of the second device 200 by referring to the information of the changed component.

In operation S705, the first device 100 may determine the existence of the device that is related to the second device 200 having the home screen that includes the component of which information is changed in operation S701.

For example, the device that is related to the second device 200 may be a device that belongs to a group of the second device 200 or may be a device of which a user is the same as a user of the second device 200. Alternatively, the device that is related to the second device 200 may be previously set so that the home screen of the second device 200 and the home screen of the related device may be changed to correspond to each other.

Hereinafter, the device that is related to the second device 200 having the component of which information is changed is referred to as a third device 300. The third device 300 may mean a device that is related to the second device 200 and may include one or more devices. The third device 300 may be one of the devices having the home screens that may be managed or configured by the first device 100. The third device 300 may be the first device 100. That is, according to the change in the component of the home screen of the second device 200, a component of a home screen of the first device 100 may also be changed.

In operation S707, when the third device 300 exists, the first device 100 may determine the existence of a component that is from among components possibly added to a home screen of the third device 300 and that corresponds to the component of which information is changed in operation S701, or may determine whether the component may be changed to correspond to the component of which information is changed in operation S701.

For example, when an application execution icon is deleted from the home screen of the second device 200, if a component that corresponds to the application execution icon exists in the home screen of the third device 300, the first device 100 may delete the component from the home screen of the third device 300.

When an application execution icon is added to the home screen of the second device 200, if a component that corresponds to the application execution icon exists in the components that may be added to the home screen of the third device 300, the first device 100 may add the component to the home screen of the third device 300. The components that may be added to the home screen of the third device 300 may be generated in consideration of display environment information of the third device 300.

When an application that corresponds to the application execution icon is not installed, the first device 100 may determine whether the application may be installed in the third device 300. After the installation of the application is completed, the first device 100 may determine whether to add the application execution icon to the home screen of the third device 300.

In operation S709, the first device 100 may configure the home screen of the third device 300 based on the changed information of the component. In more detail, when a component that corresponds to the changed component exists in the home screen of the third device 300, the first device 100 may change the corresponding component. Alternatively, the component that corresponds to the changed component may exist and may be added to the home screen of the third device 300, the first device 100 may add the corresponding component to the home screen of the third device 300.

In operation S711, the first device 100 may transmit home screen configuration information to the third device 300. The third device 300 that receives the home screen configuration information in operation S711 may display its home screen based on the received home screen configuration information.

The aforementioned description is related to a case in which a component included in a home screen is changed or deleted. However, one or more exemplary embodiments are not limited thereto, and when a portion of a home screen of one of devices is changed, the first device 100 may change home screens of the other devices so as to allow the home screens to correspond to the changed portion, so that the home screens may all be consistent. For example, when the home screens are changed into a completely consistent design according to a theme set by a launcher program, the first device 100 may obtain a design that may be applied to each of the devices and then may change each of the home screens of the devices so as to allow the home screens to correspond to the set theme.

Figure 8:
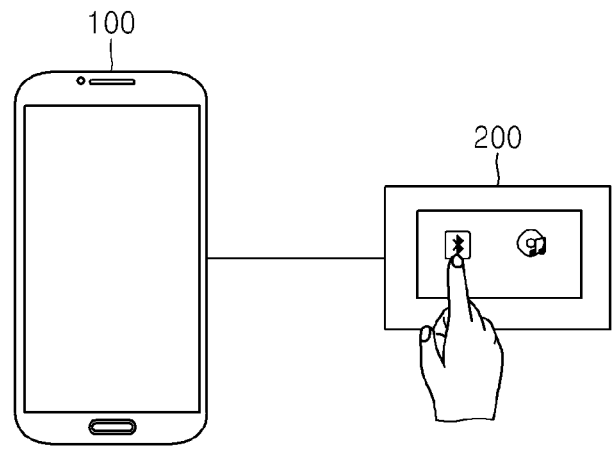
FIG. 8 illustrates a method of configuring, by a first device, a home screen of a second device according to an input that is received by the second device, according to an exemplary embodiment.

FIG. 8 illustrates a method of configuring, by the first device 100, a home screen of the second device 200 according to an input that is received by the second device 200, according to an exemplary embodiment.

Referring to FIG. 8, components of the home screen of the second device 200 may be edited according to the input that the second device 200 receives from a user.

In more detail, the second device 200 may transmit input information from the user to the first device 100. According to the input information, the first device 100 may obtain home screen configuration information by editing and reconfiguring the components of the home screen of the second device 200, and may transmit the home screen configuration information to the second device 200. The second device 200 may display its home screen based on the received home screen configuration information.

Figure 9:
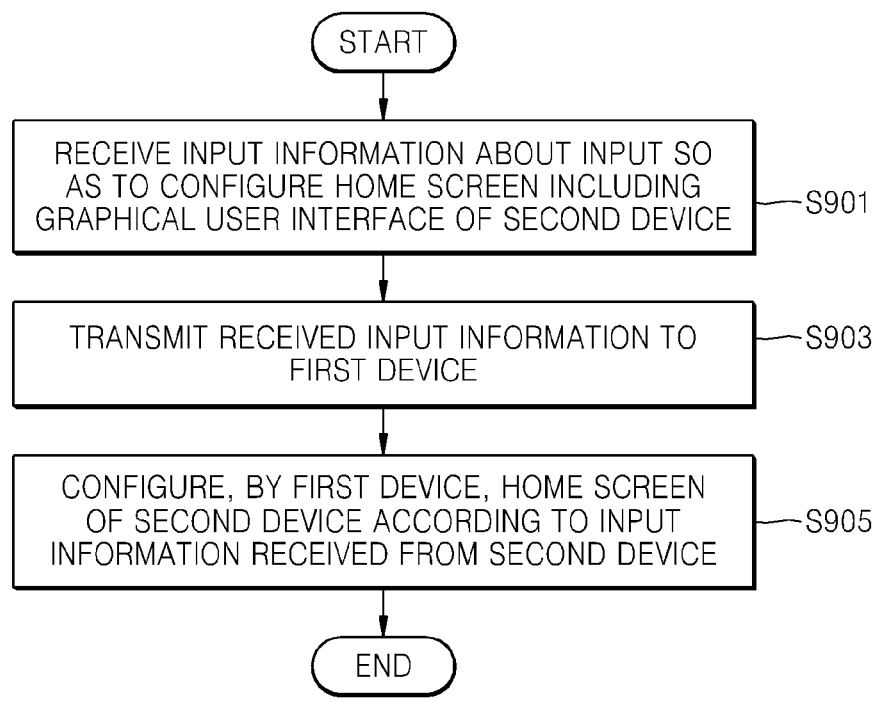
FIG. 9 is a flowchart of a method of configuring, by the first device, a home screen of the second device according to an input that is received by the second device, according to an exemplary embodiment.

FIG. 9 is a flowchart of the method of configuring, by the first device 100, a home screen of the second device 200 according to an input that is received by the second device 200, according to an exemplary embodiment.

The first device 100 may be a body that manages and configures the home screen of the second device 200. That is, when the second device 200 transmits, to the first device 100, an input signal that is received by or occurs in the second device 200, a process that corresponds to the input signal may be performed by the first device 100, instead of the second device 200.

Referring to FIG. 9, in operation S901, the second device 200 may receive an input to configure the home screen including a GUI of the second device 200. The second device 200 may receive the input from a user via an inputter of the second device 200, and the input may include a control signal that occurs in the second device 200 so as to configure the second device 200. For example, when a new application is installed in the second device 200, a signal may be generated to add an execution icon of the new application to the home screen of the second device 200. On the contrary, when an application is deleted in the second device 200, a signal may be generated to delete an execution icon of the deleted application from the home screen of the second device 200.

In operation S903, the second device 200 may transmit the input received in operation S901 to the first device 100.

In operation S905, the first device 100 may configure the home screen of the second device 200 according to information of the input that is received from the second device 200. Here, the home screen may be configured according to home screen setting information of the second device 200. The home screen setting information may include information about areas of the home screen in which components may be positioned according to component types, and information about array methods, sizes, shapes, designs, or the like of the components, in consideration of display environment information of the second device 200.

When the home screen is configured in operation S905, new home screen configuration information of the second device 200 may be stored in the memory of the first device 100 or may be transmitted to the second device 200.

Figure 10:
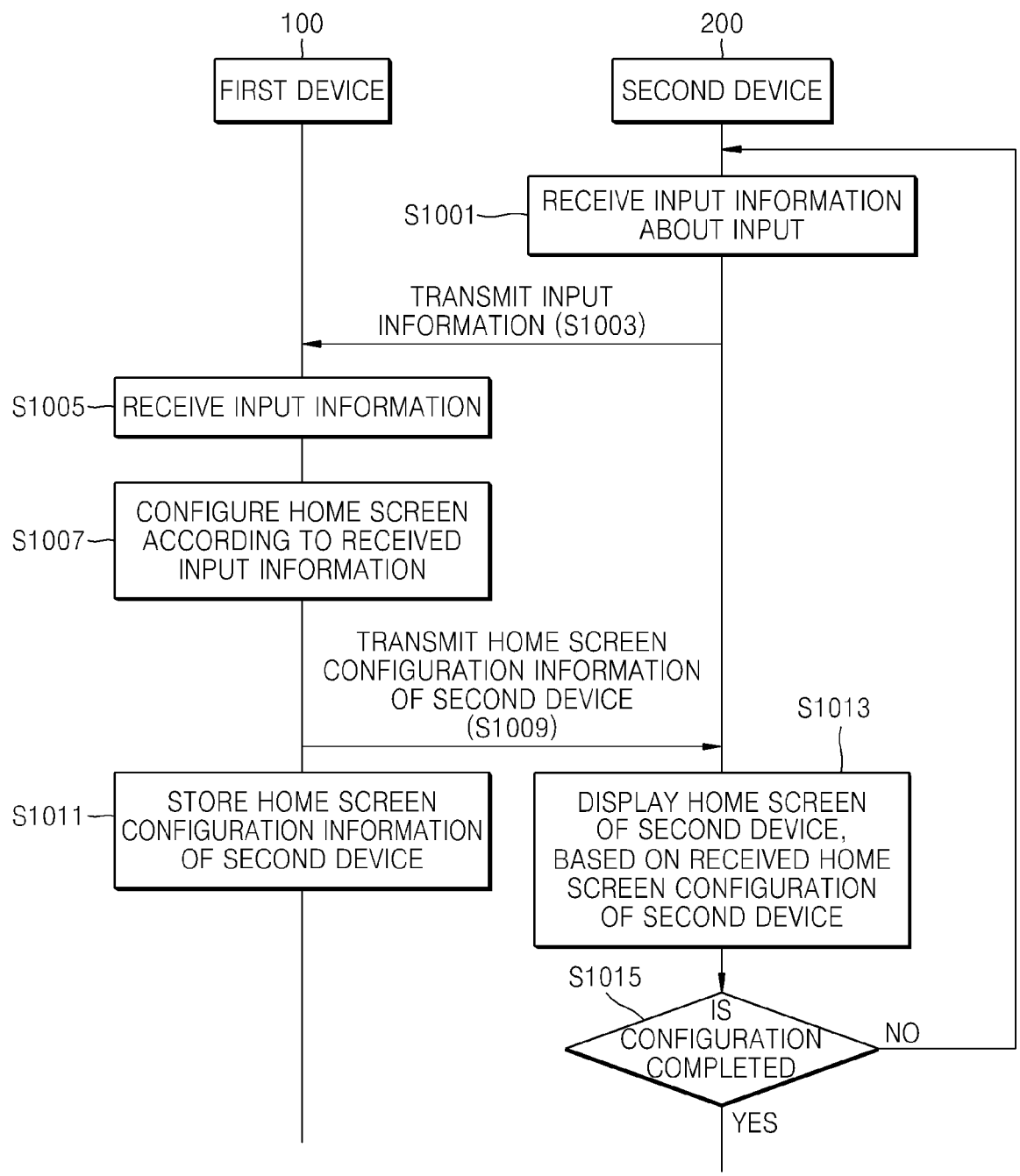
FIG. 10 is a flowchart of a method of configuring, by the first device, a home screen of the second device according to an input that is received by the second device, according to another exemplary embodiment.

FIG. 10 is a flowchart of a method of configuring, by the first device 100, a home screen of the second device 200 according to an input that is received by the second device 200, according to another exemplary embodiment.

Referring to FIG. 10, in operation S1001, the second device 200 may receive an input to configure the home screen of the second device 200. For example, the second device 200 may receive the input that involves moving, deleting, adding, or changing a component included in the home screen.

In operation S1003, the second device 200 may transmit the input received in operation S1001 to the first device 100.

In operation S1005, the first device 100 may receive the input that is transmitted in operation S1003.

In operation S1007, the first device 100 may configure the home screen of the second device 200 according to input information from the received input. The first device 100 may configure the home screen according to the input information, based on home screen configuration information of the second device 200, which is obtained from the memory. When the home screen configuration information of the second device 200 is not stored in the memory, the first device 100 may request the second device 200 for current home screen configuration information and then may receive the current home screen configuration information from the second device 200.

In operation S1007, the first device 100 may configure the home screen of the second device 200, based on home screen setting information of the second device 200. The home screen setting information may include information in which array methods, sizes, and shapes of components are set according to component types.

In operation S1009, the first device 100 may transmit home screen configuration information of the second device 200 to the second device 200.

In operation S1011, the first device 100 may store the home screen configuration information of the second device 200 in the memory of the first device 100, wherein the home screen configuration information of the second device 200 includes information about a configuration of the home screen of the second device 200 which is set in operation S1007.

In operation S1013, the second device 200 may display the home screen of the second device 200 based on the home screen configuration information of the second device 200, which is received from the first device 100.

In operation S1015, when the second device 200 attempts to continue configuring the home screen configuration information of the second device 200, the second device 200 may return to operation S1001 and then may receive or obtain an input to edit or configure the home screen of the second device 200.

Hereinafter, inner structures of the first device 100 and the second device 200 are described in detail with reference to FIGS. 11A through 12B.

Figure 11A:
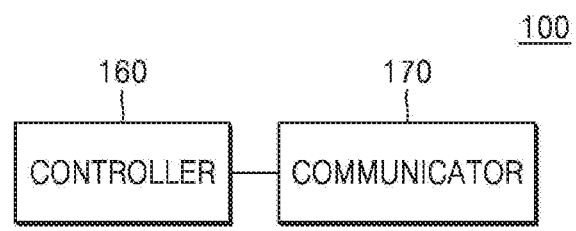
FIGS. 11A and 11B are block diagrams illustrating structures of a first device that configures a home screen of a second device, according to one or more exemplary embodiments.
Figure 11B:
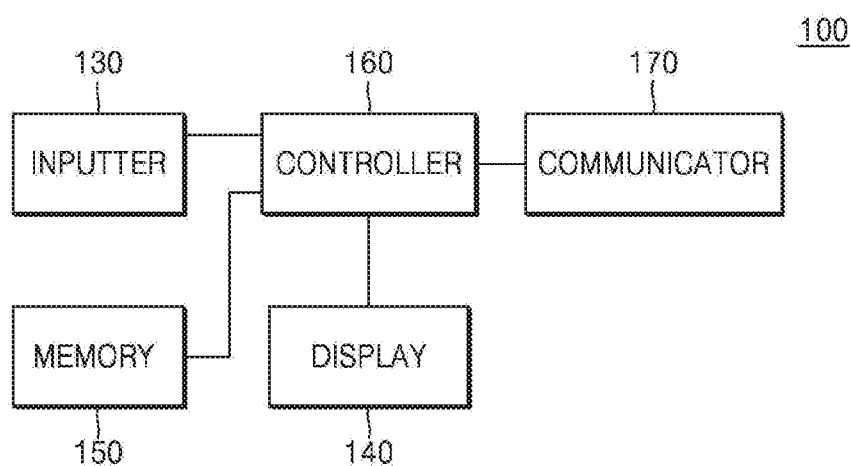

FIGS. 11A and 11B are block diagrams illustrating structures of the first device 100 that configures a home screen of the second device 200, according to one or more exemplary embodiments.

Referring to FIG. 11A, the first device 100 may include a controller 160 and a communicator 170.

The controller 160 may generally control all operations by the first device 100. For example, the controller 160 may control the communicator 170. Also, the controller 160 may configure the home screen of the second device 200.

In more detail, the controller 160 may configure components that include GUIs, according to a control signal to configure the home screen of the second device 200. The components may include the GUIs that are capable of controlling the second device 200. Also, the controller 160 may configure the home screen of the second device 200 according to input information that is received from the second device 200.

The communicator 170 may include one or more elements for enabling communication between the first device 100 and the second device 200 or between the first device 100 and devices including the second device 200.

For example, the communicator 170 may include a mobile communication module, a wireless Internet module, a wired Internet module, a near-field communication (NFC) module, or the like.

The mobile communication module may transceive a wireless signal with at least one of a base station, an external terminal, and a server in a mobile communication network. Here, the wireless signal may include various types of data according to transception of a voice call signal, a videotelephony call signal, or text/multimedia messages.

The wireless Internet module is configured for accessing wireless Internet. The wireless Internet module may be embedded or may be arranged outside. Also, the wired Internet module is a module configured for accessing wired Internet.

The NFC module is for short distance communication. Examples of the short distance communication may include, but are not limited to, Bluetooth, radio frequency identification (RFID), infrared data association (IrDA), ultra wideband (UWB), ZigBee, Wi-Fi Direct (WFD), and NFC.

In more detail, the communicator 170 may transmit home screen configuration information about a home screen of the second device 200 or a plurality of pieces of home screen configuration information about home screens of devices, which are configured by the controller 160, to the second device 200 or the devices. Also, the communicator 170 may receive input information to configure the home screen of the second device 200 from the second device 200.

Referring to FIG. 11B, the first device 100 may include the controller 160, the communicator 170, an inputter 130, a display 140, and a memory 150. The controller 160 and the communicator 170 shown in FIG. 11B may correspond to the controller 160 and the communicator 170 shown in FIG. 11A, thus, detailed descriptions thereof are omitted.

The controller 160 may generally control all operations by the first device 100. For example, the controller 160 may generally control the communicator 170, the inputter 130, the display 140, and the memory 150. Also, the controller 160 may configure a home screen of the second device 200.

When the first device 100 is enabled for managing or configuring home screens of devices, the controller 160 may configure the home screens of those devices. When one of the home screens that are managed by the first device 100 is changed, the controller 160 may control the home screens of the other devices to be changed so as to correspond to the changed initially home screen. The change in the home screen may mean a change in information relating to a component that is included in the home screen.

The communicator 170 may include one or more elements for enabling communication between the first device 100 and the second device 200 or between the first device 100 and devices including the second device 200.

The inputter 130 may generate input data for controlling an operation of the first device 100. In more detail, the inputter 130 may receive an input from a user to configure the home screen of the second device 200 or home screens of devices that include the first device 100 and the second device 200. For example, the inputter 130 may receive an input so as to control addition, deletion, movement, or a size change of components included in the home screens.

The inputter 130 may be formed of a keypad, a dome switch, a touch pad (a capacitive type/a resistive type), a jog wheel, a jog switch, an H/W button, or the like. In particular, when the touch pad and the display 140 form a layer structure. This structure may be called a touch screen.

The display 140 may display and output information that is processed by the first device 100. For example, the display 140 may display information for configuring the home screen of the second device 200 or the home screens of the devices that include the first device 100 and the second device 200. Also, when the home screens of the devices are changed in response to an input signal or a control signal, the display 140 may display home screens including a result of the change.

As described above, when the display 140 and the touchpad form the layer structure, and thus are formed as a touch screen, the display 140 may be used as both an output device and an input device. The display 140 may include at least one of a liquid crystal display (LCD), a thin film transistor-liquid crystal display (TFT-LCD), an organic light-emitting diode display, a flexible display, a three-dimensional (3D) display, and an electrophoretic display. According to the way the first device 100 is embodied, two or more displays 140 may be included. The touch screen may be formed to detect a position of a touch input, a touched area, and a touch input pressure. Also, the touch screen may detect not only an actual touch but also may detect a proximity-touch.

In the present specification, the term "actual touch" indicates a case in which a pointer actually touches a screen, and the term "proximity-touch" indicates a case in which a pointer does not actually touch a screen but approaches the screen within a predetermined distance. In the present specification, the pointer indicates an instrument that is used to touch or to proximately touch a specific portion of a displayed screen. Examples of the pointer include a stylus pen, a finger, and the like.

The memory 150 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. Also, the memory 150 may drive a web storage that performs a storing function of the memory 150 via the Internet.

In an exemplary embodiment, the memory 150 may store the home screen of the second device 200 or the home screens of the devices that may include the first device 100 and the second device 200, wherein the home screen of the second device 200 or the home screens of the devices are configured by the controller 160.

Figure 12A:
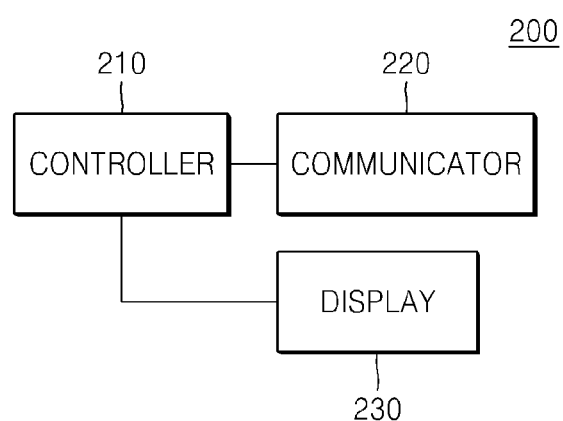
FIGS. 12A and 12B are block diagrams illustrating structures of the second device, according to one or more exemplary embodiments.
Figure 12B:
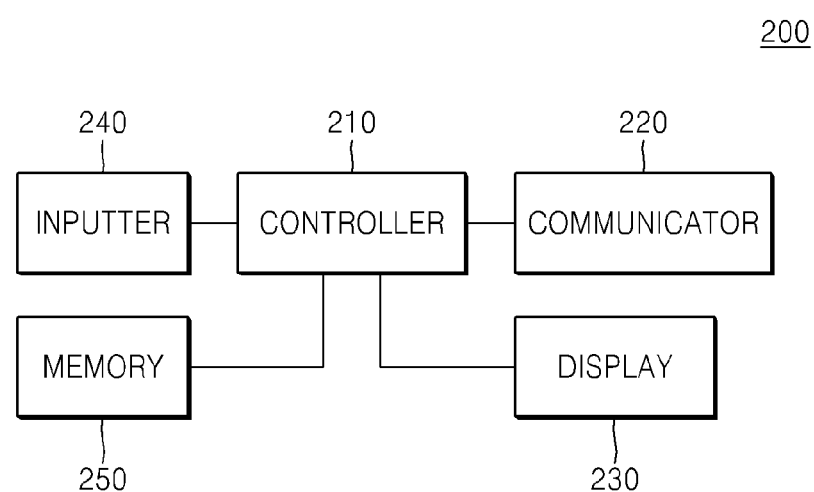

FIGS. 12A and 12B are block diagrams illustrating structures of the second device 200, according to one or more exemplary embodiments.

Referring to FIG. 12A, the second device 200 may include a controller 210, a communicator 220, and a display 230.

The controller 210 may control all operations of the second device 200. For example, the controller 210 may generally control the communicator 220 and the display 230. Also, the controller 210 may control the second device 200 to receive a home screen of the second device 200 from the first device 100 and to display the home screen.

The communicator 220 may include one or more elements for enabling communication between the first device 100 and the second device 200. For example, the communicator 220 may include a mobile communication module, a wireless Internet module, a wired Internet module, an NFC module, or the like.

In more detail, the communicator 220 may receive home screen configuration information of the second device 200 from the first device 100.

The display 230 may display and output information that is processed by the second device 200. For example, the display 230 may display the home screen of the second device 200, based on the received home screen configuration information of the second device 200. Also, the display 230 may display information for configuration of the home screen, based on a user input or an internal control signal.

Referring to FIG. 12B, the second device 200 may include a controller 210, a communicator 220, a display 230, an inputter 240 and a memory 250. The controller 210, the communicator 220 and the display 230 shown in FIG. 12B correspond to the controller 210, the communicator 220 and the display 230 shown in FIG. 12A, thus, detailed descriptions thereof are omitted there.

Referring to FIG. 12B, an inputter 240 may generate input data for controlling an operation of the second device 200. In more detail, the inputter 240 may receive an input from a user so as to configure the home screen of the second device 200. For example, the inputter 240 may receive an input so as to control addition, deletion, movement, or a size change of components included in the home screen.

The inputter 240 may be formed of a keypad, a dome switch, a touch pad (a capacitive type/a resistive type), a jog wheel, a jog switch, an H/W button, or the like. In particular, when the touch pad and the display 230 form a layer structure, this structure may be called a touch screen. When the display 230 and the touchpad form the layer structure, and thus are formed as a touch screen, the display 230 may be used as both an output device and an input device. According to the way the second device 200 is embodied, two or more displays 230 may be included. The touch screen may be formed to detect a position of a touch input, a touched area, and a touch input pressure. Also, the touch screen may detect not only an actual touch but also may detect a proximity-touch.

In an exemplary embodiment, a memory 250 may store the home screen configuration information of the second device 200.

As described above, according to the one or more of the above exemplary embodiments, because the first device may configure the home screen of the second device or home screens of devices, the home screens of the second device and the devices may be easily configured to provide consistent user interfaces or a user may directly edit the home screens, so that user convenience may be increased.

According to the one or more of the above exemplary embodiments, home screens of devices may be integrally managed by one device.

According to the one or more of the above exemplary embodiments, when a home screen of a device is configured, components included in a home screen of another device may be used.

One or more exemplary embodiments can also be embodied as computer-readable codes on a computer-readable recording medium. The computer-readable recording medium is any data storage device that can store data which can be thereafter read by a computer system (here, the computer system includes all devices having an information processing function). Examples of the computer-readable recording medium include read-only memory (ROM), random-access memory (RAM), CD-ROMs, magnetic tapes, floppy disks, optical data storage devices, etc.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the scope as defined by the following claims.

What is claimed is:

1. A method of configuring a home screen, using a first device, the method comprising:
   displaying, by the first device, a first home screen of the first device, along with a second home screen of a second device, and along with a third home screen of a third device, wherein the first device, the second device and the third device are mobile devices, and the first home screen comprises one or more components that are selectable;
   receiving, by the first device, a first input for selecting a first one of the one or more components included in the first home screen and adding the first one of the one or more components to the second home screen, while the first home screen, the second home screen, and the third home screen are displayed;
   based on the first input being received:
      configuring, by the first device, the second home screen by adding the first one of the one or more components that is selected, to the second home screen;
      transmitting, by the first device, first information of the second home screen that is configured, to the second device;
      determining, by the first device, whether the first one of the one or more components added to the second home screen is able to be added to the third home screen;
      based on the first one of the one or more components added to the second home screen being determined to be able to be added to the third home screen, configuring, by the first device, the third home screen by adding the first one of the one or more components to the third home screen; and
      transmitting, by the first device, second information of the third home screen that is configured, to the third device;
   displaying, by the first device, a components screen, along with the first home screen, the second home screen and the third home screen, wherein the components screen is separate from the first home screen, the second home screen and the third home screen and comprises the one or more components that are selectable;

receiving, by the first device, a second input for selecting a second one of the one or more components included in the components screen and adding the second one of the one or more components to the second home screen, while the first home screen, the second home screen, the third home screen and the components screen are displayed; and based on the second input being received:
  configuring, by the first device, the second home screen by adding the second one of the one or more components that is selected, to the second home screen; and
  transmitting, by the first device, the first information of the second home screen that is configured, to the second device.

2. The method of claim 1, further comprising:
receiving, by the first device, a third input for configuring the second home screen; and
configuring, by the first device, the second home screen, based on the third input being received.

3. The method of claim 2, further comprising:
obtaining, by the first device, other home screen configuration information of one or more devices that belong to one group; and
displaying, by the first device, a plurality of home screens of the one or more devices, based on the other home screen configuration information being obtained.

4. The method of claim 1, wherein the one or more components comprise any one or any combination of a widget, an application execution icon, a dock bar, a status bar, a background image, and an output effect.

5. The method of claim 1, further comprising:
determining, by the first device, setting information, based on display environment information of the second device, the setting information comprising any one or any combination of array methods, sizes, shapes, and designs of a plurality of components on the second home screen; and
configuring, by the first device, the second home screen by setting any one or any combination of the array methods, the sizes, the shapes, and the designs of the plurality of components, based on the setting information.

6. The method of claim 1, further comprising:
receiving, by the first device, a selection of one of a plurality of components included on the second home screen, while the first home screen, the second home screen, and the third home screen are displayed; and
configuring, by the first device, the second home screen by setting any one or any combination of an array, a position, and a shape of the one of the plurality of components that is selected.

7. The method of claim 1, further comprising:
generating an event in either one or both of the first device and the second device;
changing, by the first device, third information of a third one of the one or more components included in the first home screen, based on the event, wherein the second one of the one or more components is related to the event;
changing, by the first device, fourth information of a first component included in the second home screen, so that the first component corresponds to the second one of the one or more components that is changed;
changing, by the first device, the second home screen, based on the fourth information of the first component that is changed; and
transmitting, by the first device, fifth information of the second home screen that is changed, to the second device.

8. The method of claim 7, wherein the event comprises installation of a first application in the first device, and
wherein the changing of the second home screen comprises:
  adding a second component corresponding to the first application to the first home screen;
  determining whether a second application corresponding to the first application installed in the first device is installed in the second device; and
  if the second application is not installed in the second device, after the second application is installed in the second device, adding a third component corresponding to the second application installed in the second device to the second home screen.

9. The method of claim 7, wherein the event comprises a change in display information of a second component included in the first home screen, and
wherein the display information of the second component comprises any one or any combination of an array, a position, and a shape of the second component.

10. A method of configuring a home screen, the met hod comprising:
displaying, by a first device, a first home screen of the first device, along with a second home screen of a second device, and along with a third home screen of a third device, wherein the first device, the second device and the third device are mobile devices, and the first home screen comprises one or more components that are selectable;
receiving, by the first device, a first input for selecting one of the one or more components included in the first home screen and deleting the one of the one or more components from the second home screen, while the first home screen, the second home screen, and the third home screen are displayed;
based on the first input being received:
  configuring, by the first device, the second home screen by deleting the one of the one or more components that is selected, from the second home screen;
  transmitting, by the first device, first information of the second home screen that is configured, to the second device;
  determining, by the first device, whether the first one of the one or more components deleted from the second home screen is able to be deleted from the third home screen;
  based on the first one of the one or more components deleted from the second home screen being determined to be able to be deleted from the third home screen, configuring, by the first device, the third home screen by deleting the first one of the one or more components from the third home screen; and
  transmitting, by the first device, second information of the third home screen that is configured, to the third device;
displaying, by the first device, a components screen, along with the first home screen, the second home screen and the third home screen, wherein the components screen is separate from the first home screen, the second home screen and the third home screen and comprises the one or more components that are selectable;

receiving, by the first device, a second input for selecting a second one of the one or more components included in the components screen and adding the second one of the one or more components to the second home screen, while the first home screen, the second home screen, the third home screen and the components screen are displayed; and based on the second input being received:
configuring, by the first device, the second home screen by adding the second one of the one or more components that is selected, to the second home screen; and transmitting, by the first device, the first information of the second home screen that is configured, to the second device.

11. The method of claim 10, wherein the one of the one or more components comprises any one or any combination of a widget, an application execution icon, a dock bar, a status bar, a background image, and an output effect.

12. The method of claim 11, further comprising determining, by the first device, setting information comprising any one or any combination of array methods, sizes, shapes, and designs of a plurality of components on the second home screen, based on the one of the one or more components that is selected and display environment information of the second device.

13. A first device comprising:
a display;
a communicator; and
a computer configured to:
control the display to display a first home screen of the first device, along with a second home screen of a second device, and along with a third home screen of a third device, wherein the first device, the second device and the third device are mobile devices, and the first home screen comprises one or more components that are selectable;

receive a first input for selecting one of the one or more components included in the first home screen and adding the one of the one or more components to the second home screen, while the first home screen, the second home screen, and the third home screen are displayed;

based on the first input being received:
configure the second home screen by adding the one of the one or more components that is selected, to the second home screen;
control the communicator to transmit first information of the second home screen that is configured, to the second device;
determine whether the first one of the one or more components added to the second home screen is able to be added to the third home screen;
based on the first one of the one or more components added to the second home screen being determined to be able to be added to the third home screen, configure the third home screen by adding the first one of the one or more components to the third home screen; and
transmit second information of the third home screen that is configured, to the third device;

control the display to display a components screen, along with the first home screen, the second home screen and the third home screen, wherein the components screen is separate from the first home screen, the second home screen and the third home screen and comprises the one or more components that are selectable;

receive a second input for selecting a second one of the one or more components included in the components screen and adding the second one of the one or more components to the second home screen, while the first home screen, the second home screen, the third home screen and the components screen are displayed; and based on the second input being received:
configure the second home screen by adding the second one of the one or more components that is selected, to the second home screen; and
transmit the first information of the second home screen that is configured, to the second device.

14. The first device of claim 13, wherein the computer is further configured to:
receive a third input for configuring the second home screen; and
configure the second home screen, based on the third input being received.

15. The first device of claim 14, wherein the computer is further configured to:
obtain other home screen configuration information of the first device and one or more devices; and
control the display to display the first home screen and a plurality of home screens of the one or more devices, based on the other home screen configuration information being obtained.

16. The first device of claim 13, wherein the computer is further configured to:
add a corresponding component corresponding to a first application to the first home screen, wherein the first application is installed in the first device;
determine whether a second application corresponding to the first application installed in the first device is installed in the second device; and
if the second application is not installed in the second device, after the second application is installed in the second device, add a second component corresponding to the second application installed in the second device to the second home screen.

17. A first device comprising:
a display;
a communicator; and
a computer configured to:
control the display to display a first home screen of the first device, along with a second home screen of a second device, and along with a third home screen of a third device, wherein the first device, the second device and the third device are mobile devices, and the first home screen comprises one or more components that are selectable;

receive a first input for selecting one of the one or more components included in the first home screen and deleting the one of the one or more components from the second home screen, while the first home screen, the second home screen, and the third home screen are displayed;

based on the first input being received:
configure the second home screen by deleting the one of the one or more components that is selected, from the second home screen;
control the communicator to transmit first information of the second home screen that is configured, to the second device;

determine whether the first one of the one or more components deleted from the second home screen is able to be deleted from the third home screen;

based on the first one of the one or more components deleted from the second home screen being determined to be able to be deleted from the third home screen, configure the third home screen by deleting the first one of the one or more components from the third home screen; and transmit second information of the third home screen that is configured, to the third device;

control the display to display a components screen, along with the first home screen, the second home screen and the third home screen, wherein the components screen is separate from the first home screen, the second home screen and the third home screen and comprises the one or more components that are selectable;

receive a second input for selecting a second one of the one or more components included in the components screen and adding the second one of the one or more components to the second home screen, while the first home screen, the second home screen, the third home screen and the components screen are displayed; and based on the second input being received:
configure the second home screen by adding the second one of the one or more components that is selected, to the second home screen; and
transmit the first information of the second home screen that is configured, to the second device.

18. A non-transitory computer-readable recording medium having recorded thereon a computer program for executing a method of configuring a home screen, using a first device, the method comprising:

displaying, by the first device, a first home screen of the first device, along with a second home screen of a second device, and along with a third home screen of a third device, wherein the first device, the second device and the third device are mobile devices, and the first home screen comprises one or more components that are selectable;

receiving, by the first device, an input for selecting one of the one or more components included in the first home screen and adding the one of the one or more components to the second home screen, while the first home screen, the second home screen, and the third home screen are displayed;

based on the input being received:
configuring, by the first device, the second home screen by adding the one of the one or more components that is selected, to the second home screen;
transmitting, by the first device, first information of the second home screen that is configured, to the second device;
determining, by the first device, whether the first one of the one or more components added to the second home screen is able to be added to the third home screen;
based on the first one of the one or more components added to the second home screen being determined to be able to be added to the third home screen, configuring, by the first device, the third home screen by adding the first one of the one or more components to the third home screen; and
transmitting, by the first device, second information of the third home screen that is configured, to the third device;
displaying, by the first device, a components screen, along with the first home screen, the second home screen and the third home screen, wherein the components screen is separate from the first home screen, the second home screen and the third home screen and comprises the one or more components that are selectable;
receiving, by the first device, a second input for selecting a second one of the one or more components included in the components screen and adding the second one of the one or more components to the second home screen, while the first home screen, the second home screen, the third home screen and the components screen are displayed; and
based on the second input being received:
configuring, by the first device, the second home screen by adding the second one of the one or more components that is selected, to the second home screen; and
transmitting, by the first device, the first information of the second home screen that is configured, to the second device.

19. A system for configuring home screens, the system comprising:

a first device comprising:
a first display;
a first communicator; and
a first computer configured to:
control the first display to display a first home screen of the first device, along with a second home screen of a second device, and along with a third home screen of a third device, wherein the first device, the second device and the third device are mobile devices, and the first home screen comprises one or more components that are selectable;
receive a first input for selecting one of the one or more components included in the first home screen and adding the one of the one or more components to the second home screen, while the first home screen, the second home screen, and the third home screen are displayed;
based on the first input being received:
configure the second home screen by adding the one of the one or more components that is selected, to the second home screen;
control the first communicator to transmit first information of the second home screen that is configured, to the second device;
determine whether the first one of the one or more components added to the second home screen is able to be added to the third home screen;
based on the first one of the one or more components added to the second home screen being determined to be able to be added to the third home screen, configure the third home screen by adding the first one of the one or more components to the third home screen; and
transmit second information of the third home screen that is configured, to the third device;
control the display to display a components screen, along with the first home screen, the second home screen and the third home screen, wherein the components screen is separate from the first home screen, the second home screen and the third home screen and comprises the one or more components that are selectable;

receive a second input for selecting a second one of the one or more components included in the components screen and adding the second one of the one or more components to the second home screen, while the first home screen, the second home screen, the third home screen and the components screen are displayed; and based on the second input being received:
- configure the second home screen by adding the second one of the one or more components that is selected, to the second home screen; and
- transmit the first information of the second home screen that is configured, to the second device; and the second device comprising:
- a second communicator configured to receive, from the first device, the first information of the second home screen that is configured;
- a second display; and
- a second computer configured to control the second display to display the one of the one or more components that is added to the second home screen, based on the first information of the second home screen that is configured being received.

20. The method of claim 1, further comprising:

receiving, by the first device, third information for reconfiguring the second home screen of the second device, from the second device;

reconfiguring, by the first device, the second home screen, based on the third information that is received; and transmitting, by the first device, fourth information of the second home screen that is reconfigured, to the second device.

* * * * *